United States Patent [19]

Janeway

[11] Patent Number: 5,763,510
[45] Date of Patent: Jun. 9, 1998

[54] WOOD SAVER EXTERIOR OIL STAIN

[75] Inventor: Davis Janeway, Keene, Calif.

[73] Assignee: David Foster, Bakersfield, Calif.

[21] Appl. No.: 818,526

[22] Filed: Mar. 14, 1997

[51] Int. Cl.$^6$ .............................. C08K 5/34; C08K 5/06; C08K 3/28

[52] U.S. Cl. ........................... 524/91; 524/102; 524/377; 524/429

[58] Field of Search .............................. 524/91, 102, 377, 524/429

[56] References Cited

U.S. PATENT DOCUMENTS

| | | | |
|---|---|---|---|
| 4,021,432 | 5/1977 | Holt et al. | 524/102 |
| 4,314,933 | 2/1982 | Berner | 524/102 |
| 4,923,760 | 5/1990 | Adkins et al. | 428/541 |

Primary Examiner—Kriellion S. Morgan
Attorney, Agent, or Firm—Merchant, Gould, Smith, Edell, Welter & Schmidt

[57] ABSTRACT

A wood treatment composition. The composition comprises a stain vehicle wherein the stain vehicle comprises modified tung and linseed oils, a co-solvent, a foam control agent, an alkali, a surfactant, at least one UV-light blocker, a free radical scavenger, a drier catalysts and an aqueous solvent.

14 Claims, No Drawings

WOOD SAVER EXTERIOR OIL STAIN

FIELD OF THE INVENTION

The present invention is directed at a composition for the treatment of wood to preserve and protect wood exposed to weathering, sun light and environmental pollutants.

BACKGROUND OF THE INVENTION

Wood is used extensively as an exterior building material for roofing, siding, fencing, patios, decks, spas and other such uses. When the wood is new it exhibits a desirable color and grain, however, as the wood is exposed to the weathering elements, sun light and environmental pollutants the wood becomes gray and discolored. Not only does the wood lose its color but the effects of weathering result in drying, curling and splitting which can significantly reduce the useful life of the wood.

Many products are available for protecting wood. However, these products usually do not last for more than a year before an additional coat must be reapplied.

It has been known for many years that woods of various types may be preserved by chemical treatment. For example, lumber has been treated with: creosote to prevent decay and to prevent termite attack; pentachlorophenol and compounds of copper, chromium and arsenic have been used as preservatives. However, many of these treatments result in undesirable coloration of the treated wood, the need to use high temperatures and/or pressures in the treatment process, the use of toxic or environmentally dangerous chemicals, lack of penetration case hardening, etc. Moreover the treating agents do not satisfactorily protect the wood against leaching of the preservation or treating agent, especially wood used for exterior applications and/or for contact with moisture.

The amount of deterioration of wood exposed to exterior environmental condition varies widely, depending on the type of wood involved and the location of the structure containing the wood. While some woods such as redwood and cedar have better than average weathering characteristics they still become discolored and damaged due to prolonged exposure to the environment. Additionally, wood exposed to a humid environment, such as that found in the southern United States, is susceptible to attack by mold and other microorganisms, whereas wood exposed in dry climate and at high altitudes is susceptible to damage from ultraviolet light.

There is a need for a composition for the treatment of wood which will withstand weathering for an extended period of time before re-application is required. It is also desirable that the treatment prevent or inhibit discoloration, drying, curling and splitting of the treated wood. It is also desirable that the composition fills the pores of the wood to be treated without leaving a surface film build-up, thus avoiding the need for surface preparation before re-application of the composition.

SUMMARY OF THE INVENTION

The present invention is directed at a wood treatment composition for protecting exterior wood exposed from weathering, ultraviolet light and other environmental damage. The composition comprises a stain vehicle wherein the stain vehicle comprises modified tung and linseed oils, a co-solvent, a foam control agent, an alkali, a surfactant, at least one UV-light blocker, a free radical scavenger, a drier catalysts and an aqueous solvent.

DETAILED DESCRIPTION

The present invention is directed at a composition for treating wood to preserve the appearance and condition of the treated wood. The composition of the present invention includes a stain vehicle or primary film, a co-solvent or coupling solvent, a foam control agent, at least one surfactant, at least one ultraviolet light blocking agent, at least one free radical scavenger and a drier catalyst. This composition is suitable for use in dry environments and high altitude environments where the wood is prone to damage by ultraviolet light. Additionally, the composition may further include fungicides or mildewcides to inhibit the growth of fungus where the wood is to be exposed to a humid environment. Additionally the composition of the present invention may also include a pigment or tinting color to enhance the natural appearance of the wood.

Stain vehicles or primary films suitable for use in the present invention are ones that are water soluble to maximize penetration of the composition into the wood being treated and preferable include oils such as tung oil and linseed oil. A stain vehicle suitable for use in the present invention are ones such as those sold under the tradename AQUAMAC 1610 MODIFIED OIL by McWhorter Technologies of Carpentersville, Ill. This compound is a mixture of modified tung and linseed oil which have been modified to render the compositions water soluble. The AQUAMAC 1610 MODIFIED OIL has a weight of 1.02 to 1.04 kg/l, 97.3 to 98.7 solids (determined by the hot plate method at 149° C. for 30 minutes), viscosity of 74 to 75 (by the Garner Tube Method), an acid number (on solids basis) of 80 to 90 and has a flash point of about 74° C. The composition has a clear appearance. The stain vehicle is used at a final concentration of about 5% to about 50%, by weight. In a preferred embodiment the stain vehicle, AQUAMAC 1610 MODIFIED OIL, is used at a concentration of about 24%, by weight.

The composition of the present invention also includes an alkali to neutralize acid groups present on the molecules of the stain vehicle, thereby forming a polymeric salt which is water soluble. Sufficient alkali is added so that the pH of the final composition is about 8. In a preferred embodiment ammonium hydroxide is used since it is volatile and does not leave a residue when the composition is dried although other volatile alkali compositions could also be used. About 5.4%, by weight, of a 28%, by weight, solution or a final concentration of about 1.5%, by weight, of ammonium hydroxide is used in the composition of the present invention.

The co-solvent or coupling solvent helps to solubilize the stain vehicles or primary films in the water solvent. It also aids in the long-term stability of the composition and improves penetration of the stain vehicles into the wood substrate. Suitable compositions for use as a co-solvent are compositions such as glycol ethers or alcohols which are soluble in both aqueous and organic solutions. The co-solvent is used at a concentration sufficient, at its lower end, to solubilize the stain vehicle and at its upper end the concentration used is usually determined by environmental regulations. In California, for example, the maximum allowable volatile organic compounds (VOC) is 340 grams/liter. In a preferred embodiment of the present invention propylene glycol-n-butyl ether is used as the co-solvent at a concentration of about 6.4%, by weight, (205.5 grams VOC/liter).

The foam control agent is used to inhibit foaming of the composition during preparation and use. A suitable foam control agent for use in the present invention is Byk®-020 sold by Byk-Chemie of Wallingford, Conn. Byk®-020 is a solution of modified polysiloxane copolymer with a density of 0.87 to 0.89 g/cm³, weight of 0.87 to 0.89 kg/l, a refractive index of 1.42 to 1.43, non-volatile matter of 9 to 11%, solvents 2-butoxyethanol/2-ethylhexanol/stoddard solvent in a ratio of 6:1:1 and a flash point of 50° C. In a preferred embodiment the foam control agent is used at a concentration of about 0.44%, by weight.

The surfactant is used to stabilize the solution and to solubilize the ultraviolet light blocking agents. A suitable surfactant for use in the present invention is a surfactant with a mixed anionic and non-ionic character, such as the surfactant sold under the tradename Disperbyk®-181 by Byk-Chemie. Disperbyk®-181 is an alkanolammonium salt of a polyfunctional polymer with anionic/non-ionic character. In a preferred embodiment the surfactant is used at a concentration of about 0.34%, by weight.

The ultraviolet light blocking agents and free radical scavengers are used to block ultraviolet light to inhibit the damaging effects of the ultraviolet light on the wood to be protected. Suitable ultraviolet light blocking agents for use in the present invention are agents such as those sold under the tradenames TINUVIN 292 and TINUVIN 1130 by Ciba-Geigy of Hawthorn, New York. TINUVIN 292 adds longevity to the coating by scavenging free radicals to inhibit breakdown of the oil. TINUVIN 1130 "blocks" ultraviolet light and inhibits damage to and discoloration of the wood.

TINUVIN 292 is bis(1,2,2,6,6-pentamethyl-4-piperidinyl)sebacate and is covered by U.S. Pat. Nos. 4,021,432; 4,046,737; 4,049,647; 4,314,933; 4,344,876; and 4,426,471, which are incorporated herein by reference. TINUVIN 1130 is a mixture of about 52% poly(oxy-1,2-ethanediyl), α-(3-(3-(2H-benzotriazol-2-yl)-5-(1,1-dimethylethyl)-4-hydroxyphenyl)-1-oxopropyl)-ω-hydroxy and about 35% poly(oxy-1,2-ethanediyl), α-(3-(3-(2H-benzotriazole-2-yl)-5-(1,1-dimethylethyl-4-hydroxyphenyl)-1-oxopropyl-ω-(3-(3-(2H-benzotriazol-2-yl)-5-(1,1-dimethylethyl)-4-hydroxyphenyl)-1-oxopropoxy) and about 13% polyethylene glycol. TINUVIN 1130 is covered by U.S. Pat. Nos. 4,314,933; 4,426,472; 4,344,876; and 4,426,471, which are incorporated herein by reference. In a preferred embodiment the ultraviolet light blocking agents are used at concentrations of about 0.5%, by weight, for the TINUVIN 292 and 0.77%, by weight, for the TINUVIN 1130. Preferably a mixture of both the TINUVIN 292 and TINUVIN 1130 is used.

The drier catalyst is used to promote drying of the oil/resin stain vehicle so that the composition will dry in a time period which is "useful" for use. A suitable drier catalyst for use in the present invention is a drier catalyst such as the drier catalyst sold under the tradename CK-10% by Huls America Inc. In a preferred embodiment the drier catalyst is used at a concentration of about 0.97%, by weight.

A preferred embodiment of the composition of the present invention, for use to protect wood against damage from ultraviolet light, is shown in Table I.

TABLE I

| Component | Preferred Agent | Concentration (%, by weight) |
|---|---|---|
| Stain Vehicles | Resin #1610 | 24.1 |
| Co-solvent | Propylene Glycol-n-butyl ether | 6.37 |
| Foam Control | Byk#020 | 0.44 |

TABLE I-continued

| Component | Preferred Agent | Concentration (%, by weight) |
|---|---|---|
| Alkali | Ammonium Hydroxide (28%, by weight, solution) | 5.4 |
| Surfactant | Byk#181 | 0.34 |
| Free Radical Scavenger | TINUVIN 292 | 0.5 |
| UV-light blocker | TINUVIN 1130 | 0.77 |
| Drier Catalysts | CK-10% | 0.97 |
| Solvent | Water | 61.11 |

In addition, the formulas of the composition of the present invention may also include agents to inhibit the growth of microorganisms in the wood. Fungicides and mildewcides suitable for use in the present invention are well known by those skilled in the art.

In addition, the formulas of the composition of the present invention may also include pigments. Pigments suitable for use in the present invention include "predispersed universal tinting colors" which are well known in the art and are commonly use to tint paints. These tints are added at a concentration of about 3%, by volume.

In preparing the composition of the present invention the alkali is first added to the stain vehicle and the resultant mixture is stirred to blend the two components together to thereby react the acid groups present on the stain vehicle. The mixture is preferably stirred using a blender type mixer such as a Cowles Disperser. The stirring is performed at a speed sufficient to mix the components, but, slowly enough to avoid excessive frothing of the mixture. After the alkali and stain vehicles are mixed the other components are added, preferably in the following order, co-solvent, foam control agent, surfactant, UV-light blocker, free radical scavenger, drier catalysts, fungicide and then water. The components are then mixed.

For use the composition of the present invention is painted onto the wooden surface to be treated. In the case of new wood the composition of the present invention may be applied to the wood without any pretreatment of the wood. In the case of old, weathered wood, the wood is preferably pretreated to clean the wood by methods such as pressure water cleaning, or scrubbing with commercially available oxalic acid containing preparation which "brighten" the wood. The composition of the present invention is applied to the wood by any of the means commonly used for the application of paint to a surface, such as, with a paint roller, paint brush or paint sprayer.

EXAMPLE 1

A portion of an exterior wood surface was coated with the composition of the present invention and exposed to weathering at an altitude of 4,000 ft in a dry environment. A separate portion of the exterior wood surface was coated with a conventional oil-based exterior stain which included a tung oil solvent-borne stain. This stain is commercially available and sold by Pioneer Paints of Bakersfield, Calif., under the tradename #650 Semi Transparent Stain.

The composition of the present invention was found to penetrate the wood more deeply than the conventional oil based solvent-borne stain. Additionally the ultraviolet light blockers present in the composition of the present invention prevented discoloration of the treated wood. The composition of the present invention required re-application after a longer period of time than the conventional composition.

The composition of the present invention was found to be superior to the conventional stain in the length of time the wood remained protected, the ease of re-application of the composition and inhibition of discoloration of the treated wood.

EXAMPLE 2

A comparison was made between the composition of the present invention and commercially available wood treatment products. The products were analyzed for the "% solids" content. The solids in a wood treatment composition are the active ingredients of the composition. The remaining components are carriers which evaporate after application of the product to the wood being treated. The results of the analysis are summarized in Table II.

TABLE II

| Product Name | % Solids |
| --- | --- |
| Cobot's Wood Preservative | 10.1 |
| DAP "Woodlife" Clear Wood Preservative | 1.9 |
| Olympic Clear Wood Preservative | 9.0 |
| Thompson's Water Seal | 10.1 |
| Composition of the Present Invention | 27.0 |

The composition of the present invention includes between 2.7 to 14.2 times as much solids as other commercially available wood preservatives. The high content of solids makes the composition of the present invention easy to apply and a single application is usually sufficient to deliver enough solids to the wood to result in effective protection of the wood.

The above description of preferred embodiments of the present invention are for illustrative purposes. Variations will be apparent to those skilled in the art. In addition the invention can be practiced in the absence of any element not specifically disclosed. The scope of the invention is defined in the following claims.

What is claimed is:

1. A wood treatment composition comprising a stain vehicle wherein the stain vehicle consists essentially of modified tung and linseed oils; a co-solvent; a foam control agent; an alkali; a surfactant; at least one UV-light blocker; a free radical scavenger; a drier catalysts; and an aqueous solvent.

2. The composition recited in claim 1 further comprising a fungicide.

3. The composition recited in claim 1 further comprising a pigment tint.

4. The wood treatment composition recited in claim 1 wherein the UV-light blocker is a mixture of poly(oxy-1,2-ethanediyl), α-(3-(3-(2H-benzotriazole-2-yl)-5-(1,1-dimethylethyl)-4-hydroxyphenyl)-1-oxopropyl)-ω-hydroxy and poly(oxy-1,2-ethanediyl), α-(3-(3-(2H-benzotriazol-2-yl)-5-(1,1-dimethylethyl)-4-hydroxyphenyl)-1-oxopropyl-ω-(3-(3-(2H-benzotriazol-2-yl)-5-(1,1-dimethylethyl)-4-hydroxyphenyl)-1-oxopropoxy).

5. The wood treatment composition recited in claim 1 wherein the free radical scavenger is bis(1,2,2,6,6-pentamethyl-4-piperidinyl) sebacate.

6. The wood treatment composition recited in claim 1 wherein the co-solvent is selected from the group consisting of glycol ethers and alcohols; the foam control agent is selected from the group consisting of polysiloxane based polymers; the alkali is selected from the group consisting of volatile alkali compounds; the surfactant is selected from the group consisting of alkanolammonium salts of a polyfunctional polymers with an anionic and non-ionic character.

7. The wood treatment composition recited in claim 1 wherein the stain vehicle is present at a concentration of about 5% to 50%, by weight; the co-solvent is present at a concentration of about 6.4%, by weight; the foam control is present at a concentration of about 0.44%, by weight; the ammonium hydroxide is present at a concentration of about 1.5%, by weight; the ultraviolet light blocker is present at a concentration of about 0.77%, by weight; the free radical scavenger is present at a concentration of about 0.5%, by weight; and the drier catalyst is present at a concentration of about 0.97%, by weight.

8. A wood treatment composition comprising: a stain vehicle consisting essentially of modified tung and linseed oils; a co-solvent, selected from the group consisting of glycol ethers and alcohols; a foam control agent, selected from the group consisting of polysiloxane based polymers; an alkali, selected from the group consisting of volatile alkali compounds; a surfactant, selected from the group consisting of alkanolammonium salt of a polyfunctional polymers with an anionic and nonionic character; bis(1,2,2,6,6-pentamethyl-4-piperidinyl)sebacate; poly(oxy-1,2-ethanediyl), α-(3-(3-(2H-benzotriazol-2-yl)-5-(1,1-dimethylethyl)-4-hydroxyphenyl)-1-oxopropyl)-ω-hydroxy; poly(oxy-1,2-ethanediyl),α-(3-(3-(2H-benzotriazole-2-yl)-5-(1,1-dimethylethyl)-4-hydroxyphenyl)-1-oxopropyl-ω-(3-(3-(2H-benzotriazol-2-yl)-5-(1,1-dimethylethyl)-4-hydroxyphenyl)-1-oxopropoxy); and a drier catalyst.

9. The wood treatment composition recited in claim 8 wherein the stain vehicle is present at a concentration of about 5% to 50%, by weight; the co-solvent is present at a concentration of about 6.4%, by weight; the foam control is present at a concentration of about 0.44%, by weight; the ammonium hydroxide is present at a concentration of about 1.5%, by weight; bis(1,2,2,6,6-pentamethyl-4-piperidinyl) sebacate is present at a concentration of about 0.5%, by weight; the poly(oxy-1,2-ethanediyl), α-(3-(3-(2H-benzotriazol-2-yl)-5-(1,1-dimethylethyl)-4-hydroxyphenyl)-1-oxopropyl)-ω-hydroxy is present at a concentration of about 0.4%, by weight; the poly(oxy-1,2-ethanediyl), α-(3-(3-(2H-benzotriazole-2-yl)-5-(1,1-dimethylethyl)-4-hydroxyphenyl)-1-oxopropyl-ω-(3-(3-(2H-benzotriazol-2-yl)-5-(1,1-dimethylethyl)-4-hydroxyphenyl)-1-oxopropoxy) is present at a concentration of about 0.27%, by weight; and the drier catalyst is present at a concentration of about 0.97%, by weight.

10. The composition recited in claim 8 further comprising a fungicide.

11. The composition recited in claim 8 further comprising a pigment tint.

12. A wood treatment composition comprising: about 24.1%, by weight, of resin consisting essentially of modified tung and linseed oils; about 6.37%, by weight, propylene glycol-n-butyl ether; about 0.44%, by weight, polysiloxane based polymers; about 5.4%, by weight, ammonium hydroxide; about 0.34%, by weight, alkanolammonium salt of a polyfunctional polymer; about 0.5%, by weight, bis(1,2,2,6,6-pentamethyl-4-piperidinyl)sebacate; about 0.4%, by weight, poly(oxy-1,2-ethanediyl),α-(3-(3-(2H-benzotriazol-2-yl)-5-(1,1-dimethylethyl)-4-hydroxyphenyl)-1-oxopropyl)-ω-hydroxy; about 0.27%, by weight, poly(oxy-1,2-ethanediyl),α-(3-(3-(2H-benzotriazole-2-yl)-5-(1,1-dimethylethyl)-4-hydroxyphenyl)-1-oxopropyl-ω-(3-(3-(2H-benzotriazol-2-yl)-5-(1,1-dimethylethyl)-4-hydroxyphenyl)-1-oxopropoxy); and about 0.97%, by weight, drier catalyst.

13. The composition recited in claim 12 further comprising a fungicide.

14. The composition recited in claim 12 further comprising a pigment tint.

* * * * *